Jan. 25, 1944.  S. P. STEPHEN  2,339,960
DRIVE WHEEL CONSTRUCTION FOR AUTOMOTIVE VEHICLES
Filed Oct. 27, 1941  2 Sheets-Sheet 1
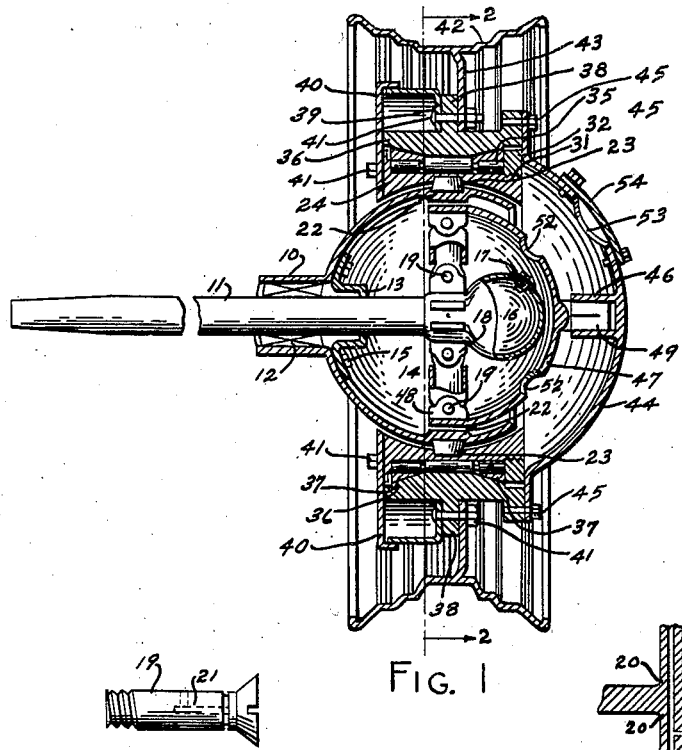
FIG. 1
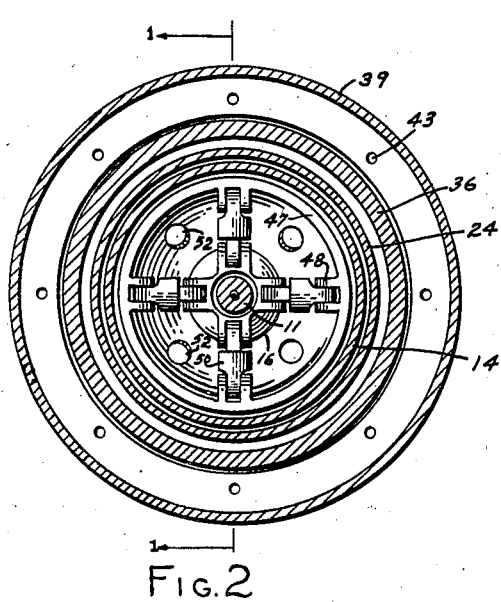
FIG. 2
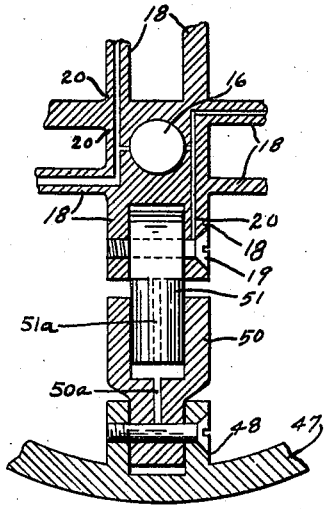
FIG. 3
FIG. 6
INVENTOR.
SAMUEL PERRY STEPHEN
BY
Martin E. Anderson
ATTORNEY Jan. 25, 1944. S. P. STEPHEN 2,339,960
DRIVE WHEEL CONSTRUCTION FOR AUTOMOTIVE VEHICLES
Filed Oct. 27, 1941 2 Sheets-Sheet 2

INVENTOR.
SAMUEL PERRY STEPHEN
BY
Martin E. Anderson
ATTORNEY

Patented Jan. 25, 1944

2,339,960

UNITED STATES PATENT OFFICE 2,339,960

DRIVE WHEEL CONSTRUCTION FOR AUTOMOTIVE VEHICLES

Samuel Perry Stephen, Colorado Springs, Colo.

Application October 27, 1941, Serial No. 416,772

7 Claims. (Cl. 180—43)

This invention relates broadly to an improvement in four wheel drive automotive vehicles and trucks and has reference more particularly to an improved steering wheel mounting.

Four wheel drive trucks are extensively employed where heavy duty service is required and are employed in great numbers by the army where transportation over rough surfaces must frequently take place.

In four wheel drive trucks the front wheels are used for steering in the usual way, and are also driven from the engine or power plant. The transmission of power to the dirigible front wheels is effected by means embodying a universal joint or gimbal connection, so positioned and constructed that it permits the front wheel to swing about the vertical spindle pivots without obstructing the transmission of power.

Since trucks are heavily loaded it is necessary to so construct the front wheel mountings that the spindle pivots will be located in the central planes of the wheels.

It is the object of this invention to produce a front wheel mounting for four wheel drive trucks which shall be of simple and substantial construction, easily adjustable to compensate for wear and which can turn through large angles, about the spindle pivots, without binding.

Another object is to produce an improved universal or flexible joint between the drive axle or shaft and the wheel, of such construction that it will transmit power smoothly and evenly at the maximum angular displacement of the front wheel.

Another object is to produce a power transmission of such construction that the axle housings can be curved or dropped down so as to lower the center of gravity of the load.

Another object is to produce a power transmission in which the four wheels may simultaneously turn at different peripheral speeds so that the wheels may turn at speeds that correspond to the curvature of the road on turns and to unevenness in the road surface.

A further object is to provide a transmission comprising three differentials, at least one of which can be locked, for so interconnecting the wheels that if some of them happen to lose its traction, due to mud, ice or snow, the other wheels will exert the required traction to keep the vehicle moving.

The above and any other objects that may become apparent, or to which attention will be called as the description proceeds, are obtained by means of a construction and an arrangement of parts that will now be described in detail and for this purpose reference will be had to the accompanying drawings in which the invention has been illustrated and in which:

Figure 1 is a diametrical section through a front wheel constructed in accordance with this invention, taken on line 1—1 Figure 2;

Figure 2 is a section taken on line 2—2 Figure 1;

Figure 3 is a partial section taken in a plane parallel to plane 2—2 and shows the construction of the radial arms of the universal;

Figure 6 is a plan view of a universal pivot bolt showing the position of the oil passages.

Figure 4:
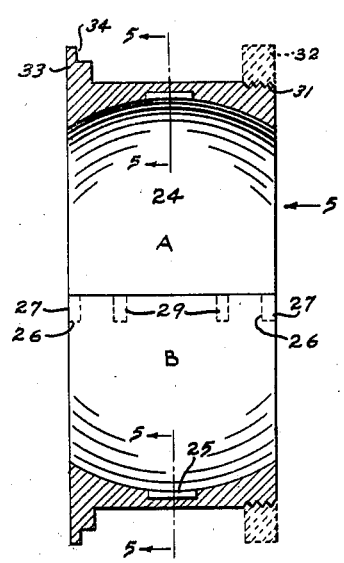
Figure 4 is a section of the wheel spindle line 4—4 of Figure 5.

In the drawings reference numeral 10 designates the axle housing and 11 the drive shaft; an anti-friction bearing 12 is positioned between the shaft and the housing. The bearing has been indicated in a general way, as it is the intention to employ any approved bearing at this point. A grease seal is held in place by cap 13 which in turn is secured to the inside of the spherical end 14 of the axle housing, by means of bolts 15.

Shaft 11 terminates in a hollow ball 16 that serves as an oil reservoir and has a fill opening closed by a plug 17. The shaft is provided adjacent the spherical oil reservoir with four pairs of lugs or ears 18 each of which has an opening for the reception of a pivot pin 19.

Referring now to Figure 3 it will be seen that reservoir 16 has an end that extends into the shaft at least as far as the middle of lugs 18. Oil channels 20 connect the reservoir 16 with the openings through which the pivot pins 19 pass and the latter have oil passages 21 through which oil may flow for the lubrication of the universal joint, as will hereinafter be more fully explained.

The semi-spherical end 14 of the axle housing is provided at diametrically opposed points, at the top and bottom, with circular seats 22 in which are positioned the spindle bearings 23, which may be of any suitable type of anti-friction construction. Surrounding the semi-spherical end 14 and enclosing the bearings 23 is a wheel spindle 24. This is made in two sections A and B (see Figures 4 and 5). Each section has a bearing seat 25 for the reception of the outer race of the corresponding spindle bearing 23. Section B has recesses 26 for the reception of lugs 27 that project from section A. Bolts 28 pass through the lugs 27 into section B and serves to hold the two parts in assembled position. Section A is also provided with dowel pins 29 that engage in suitable openings in section B.

Figure 5:
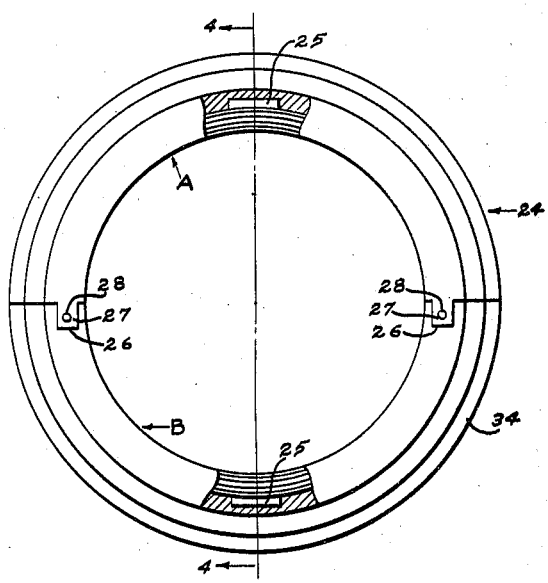
Figure 5 is a side elevation of the wheel spindle, looking in the direction of arrow 5 in Figure 4, portions being broken away to better disclose the construction.
Figure 7:
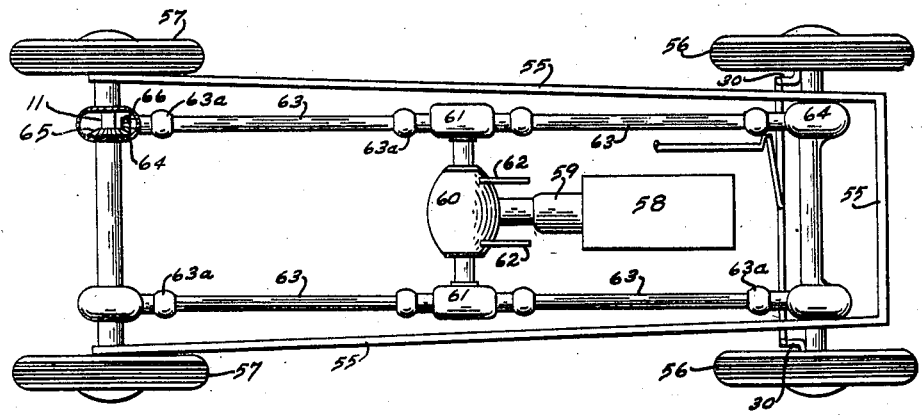
Figure 7 is a top plan view of a chassis embodying the invention.

Suitable steering arms 30 are secured to the spindle 24 by suitable means; the steering arms are shown in Figure 7 only, one end of the wheel spindle is provided with threads 31 for the reception of an abutment ring 32, which has been shown dotted in Figure 4. In the actual construction, ring 31 is made in a slightly different manner but since this detail is not part of the invention it has not been illustrated. The other end of the wheel spindle terminates in an outwardly extending flange 33 whose inner surface terminates in a rabbet 34. Bearings 35 surround the wheel spindle, one being positioned adjacent the flange 33 and the other adjacent the abutment ring 32.

Surrounding the wheel spindle and the bearings 35 is a wheel hub 36. The inner surface of the hub has two frusto-conical, outwardly flaring surfaces 37 that engage the outer races of bearings 35. An outwardly extending flange 38 surrounds the hub and to the inner surface of this a brake drum 39 is secured. A brake backing plate 40 is secured to the wheel spindle by suitable bolts 41. The brake has not been shown.

A tire rim 42 is provided with an inwardly extending flange 43 that is placed against the outer surface of flange 38 and secured thereto by bolts 41 which also serve to hold the brake drum. The latter may be additionally secured in position by other bolts.

A wheel hub cap 44 of semi-spherical shape, is secured, at its outer periphery, to the wheel hub, by means of bolts 45. From the center of the concave inner surface of the wheel hub cap a tubular member 46 extends in axial alignment with the axis of the spindle. A universal cap 47 is provided about its periphery with four pairs of inwardly extending lugs 48 and projecting from the outer surface thereof is a non-circular projection 49 that telescopes into the tubular projection 46 which has an opening of the proper size and shape to receive it.

Referring now more particularly to Figure 3 it will be seen that the corresponding pairs of lugs 18 and 48 are connected by telescopically related arms, each of which comprises a cylinder 50 and a plunger 51 provided respectively with oil passages 50a and 51a. The cylinder has been shown as pivotally connected with one pair of lugs 48 and the plunger similarly connected with the corresponding pair of lugs 18 that project from the shaft.

The telescopic arms permit the universal cap to rock or wabble with respect to the shaft 11 and the telescoping action of the connecting arms permits any slight adjustment that may be necessary to permit the parts to function smoothly and prevents binding when the front wheels are cramped for turning. With the usual type of universal joint there is a binding and jerking action when the trucks turn sharp corners, which is entirely eliminated with this construction. The telescopic arms are an important part of this universal power transmission.

From Figure 1 it will be seen that the universal cap is provided with a plurality of openings 52 and that the wheel hub cap is provided with an opening 53 closed by a cover plate 54. The openings 52 and 53 can be aligned as shown so that a wrench may be inserted to tighten and loosen the plug 17 when the reservoir 16 is to be filled with oil.

Referring now more particularly to Figure 7 the arrangement of the several elements of the power transmission will be described. The chassis frame has been designated by reference numeral 55. The springs and other conventional elements have been omitted. The front wheels have been designated by numeral 56 and the rear wheels by numerals 57 while the engine has been designated by numeral 58 and the transmission gear box by numeral 59.

It will be observed that the main differential 60 is positioned directly back of the transmission gears and connected with the auxiliary differentials 61, one of which is positioned on each side of the main differential. The construction of the differential gears has not been shown because it is old and well known and is moreover shown with great detail in U. S. Patent to Edison et al., No. 1,243,720, October 23, 1917, which also discloses the differential lock which is embodied in this invention. Rods 62 control the differential locks and correspond to rods 34 in the patent above identified.

From the auxiliary differentials, shafts 63, each of which has two universal joints 63a, extend forwardly and rearwardly to the gear boxes 64 in each of which are positioned a bevel gear 65 and a bevel pinion 66, the former being connected with shafts 11 and the latter with shafts 63. The pinions in the front gear boxes are on the inside of the bevel gears and in the rear gear boxes on the outside so as to get the same direction of rotation of the front and rear wheels.

It is obvious from the above that, although power is delivered to all of the wheels from the engine 58, the wheels on one side may rotate at a faster or slower peripheral speed than those on the other side and likewise the front and the rear wheels on each side may turn at different speeds, due to the action of the three differentials. Due to the arrangement just described there is no skidding of the tires due to passage around curves or over uneven surfaces.

If one wheel on either side should get onto a piece of ice or snow or onto slippery mud, the differential may be locked and both wheels compelled to rotate, thereby assuring traction at all times. Locks may also be provided for the auxiliary differentials if so desired. It may at times be found desirable to omit the differential lock on the main differential and have locks on the auxiliary differentials only. In the drawings the plunger element of each telescopic link has been shown as pivoted between the lugs on the shaft, but this arrangement is reversible.

What I claim as new is:

1. A steerable drive wheel mounting for automotive vehicles comprising: an axle housing; a semi-spherical, hollow ball on the extremity of said housing; spindle bearings positioned on said ball in substantial vertical alignment; a wheel spindle surrounding said ball and mounted on said bearings for pivotal movement relative to the axle housing; a wheel hub rotatably mounted on the wheel spindle; a power shaft within the housing terminating within said ball; and a universal joint structure between said power shaft and wheel hub for transmitting power to the latter, the universal joint comprises a universal cap enclosing the end of the shaft, means for effecting a nonrotatable connection between the universal cap and the wheel hub, and means for transmitting power from the shaft to the universal cap comprising, a plurality of telescopic links, each having a cylinder and a plunger, said links interconnecting the universal cap and the shaft.

2. A steerable drive wheel mounting for automotive vehicles comprising: an axle housing; a semi-spherical, hollow ball on the extremity of said housing; spindle bearings positioned on said ball in substantial vertical alignment; a wheel spindle surrounding said ball and mounted on said bearings for pivotal movement relative to the axle housing; a wheel hub rotatably mounted on the wheel spindle; a power shaft within said housing terminating within said ball; a transmission cap enclosing the extremity of said power shaft; links pivotally connecting the former with the latter so that said cap may be swung in any direction from the axis of said shaft; connecting means between the cap and the wheel hub for transmitting the rotative effort of the former to the latter, the end of the shaft having an oil reservoir connected with the links by oil passages to effect lubrication of the links.

3. A steerable drive wheel mounting for automotive vehicles comprising: an axle housing; a semi-spherical, hollow ball on the extremity of said housing; spindle bearings positioned on said ball in substantial vertical alignment; a wheel spindle surrounding said ball and mounted on the bearings for pivotal movement relative to the axle housing; a wheel hub rotatably mounted on the spindle; a power shaft within the housing, terminating within said ball; a transmission cap enclosing the extremity of said power shaft; pivotally mounted telescopic links connecting the cap with the shaft so that said cap may swing in any direction relative to the axis of said shaft; a hub cap secured at its periphery to said wheel hub and means comprising two telescopically related shafts for connecting the transmission cap to the hub cap to transmit the rotative effort of the former to the wheel.

4. In a four wheel drive automotive vehicle having an axle housing provided with vertically spaced spindle bearings, a wheel spindle enclosing the bearings and operatively connected with them for pivotal movement relative to the axle housing, a wheel hub rotatably mounted on the spindle, means for rotating the wheel hub while permitting free movement about the spindle bearings comprising a shaft mounted for rotation in the axle housing; a plurality of pairs of angularly spaced lugs extending radially from the shaft in angularly spaced relation, each pair having openings for a pivot pin; a wheel hub cap removably connected with the wheel hub, a universal cap enclosing the end of the shaft, a plurality of pairs of lugs projecting inwardly from the cap in angularly spaced relations, corresponding to the positions of the lugs on the shaft; telescopic arms connecting corresponding pairs of lugs on the shaft and universal cap and a non-rotatable connection between the universal cap and the wheel hub cap.

5. In a four wheel drive automotive vehicle having an axle housing provided with vertically spaced spindle bearings, a wheel spindle enclosing the bearings and operatively connected with them for pivotal movement relative to the axle housing, a wheel hub rotatably mounted on the spindle, means for rotating the wheel hub while permitting free movement about the spindle bearings, comprising a shaft mounted for rotation in the axle housing; a plurality of pairs of spaced lugs extending radially from the shaft in angularly spaced relation, each pair having openings for a pivot pin; a wheel hub cap removably connected with the wheel hub, a universal cap enclosing the end of the shaft, a plurality of pairs of lugs projecting inwardly from the universal cap in angularly spaced relations, corresponding to the positions of the lugs on the shaft, telescopic arms connecting corresponding pairs of lugs; the end of the shaft having a lubricant reservoir and passages connecting the reservoir with oil channels on each pair of lugs for effecting automatic lubrication of the pivots, and a non-rotatable connection between the wheel hub cap and the universal cap.

6. A universal joint for use with front wheel drive trucks comprising a drive shaft having one end provided with a plurality of angularly spaced pairs of lugs, the lugs of each pair having openings for the reception of pivot pins, the shaft having a lubricant reservoir and passages communicating the reservoir with one pivot pin opening in each pair of lugs; a universal cap enclosing the end of the shaft, the cap having pairs of spaced inwardly projecting lugs positioned in radial alignment with the pairs of lugs on the shaft; a plunger pivoted to each pair of shaft lugs, a cylinder pivotally connected with each pair of lugs on the cap; the plunger being slidably connected with the cylinder, the pivot pin for the plunger, and the plunger having oil passages in communication with the first mentioned passages whereby the pivots and the telescopic plunger and cylinder will be automatically lubricated.

7. A steerable drive wheel mounting for automotive vehicles comprising an axle housing terminating in a hollow semi-spherical member, a drive shaft mounted for rotation in the housing, the end of the shaft terminating in a spherical oil reservoir; a plurality of pairs of spaced lugs arranged in equangularly spaced relations around the shaft, each pair of lugs having axially aligned openings for the reception of pivot pins, the shaft and lugs having passages for oil which permit oil to flow from the reservoir to the pivot pin openings; pivot pins in the openings, the pivot pins having oil passages extending from substantially the middle points to near one end, positioned to communicate with the oil passage from the reservoir; two part telescopic links having one part attached to the shaft by the pivot pins, the semi-spherical end of the axle housing having pivot bearings extending from the top and bottom thereof; a two part wheel spindle enclosing the spindle bearings and operatively connected therewith for pivotal movement relative to the axle housing; a wheel hub rotatably mounted on the spindle; a wheel hub cap secured to the wheel hub and enclosing the outer end of the spindle, a universal cap enclosing the spherical end of the drive shaft, the universal cap having a plurality of pairs of lugs spaced to register radially with the lugs on the drive shaft, the other parts of the links being pivotally connected with the lugs on the universal cap, and means for transmitting power from the universal cap to the wheel hub cap comprising two telescopically connected and relatively non-rotatable members.

SAMUEL PERRY STEPHEN.